UNITED STATES PATENT OFFICE.

LEOPOLD BRANDEIS, OF BROOKLYN, NEW YORK.

MANUFACTURE OF BRONZE-POWDER.

SPECIFICATION forming part of Reissued Letters Patent No. 9,667, dated April 19, 1881.

Original No. 53,563, dated April 3, 1866. Application for reissue filed February 19, 1881.

*To all whom it may concern:*

Be it known that I, LEOPOLD BRANDEIS, a citizen of the United States, residing at Brooklyn, in the county of Kings and State of New York, have invented a new and useful Improvement in the Manufacture of Bronze-Powder, of which the following is a specification.

Prior to my invention the method in which bronze-powder was made was by first casting into an ingot the proper alloy of copper and tin or zinc, and then subjecting this ingot to the action of hammers worked by steam or other power to reduce it to the proper dimensions for the subsequent processes, then to anneal it and pass it between heavy rollers moved by steam or water power, the operations of annealing and rolling being repeated until the metal was reduced to a degree of thinness and flexibility sufficient to allow it to be beaten into thin metallic sheets or leaves between layers of parchment or gold-beaters' skin. These leaves were then divided into small fragments by forcing them through the meshes of sieves, and these small fragments, subjected to the action of reducing and grinding machinery, resulted in the brilliant powder of almost impalpable fineness known in the trade as "bronze-powder."

The former method involved a large number of preliminary processes and a considerable outlay for machinery, besides the necessity of many hands and the expense of furnaces, fuel, and skilled labor in the annealing, which was supposed to be necessary to give the metal or alloy the requisite flexibility and brilliancy before it was broken into fragments.

My invention consists in the discovery that by proper tools thin shavings of the metal can be cut from the ingot, which possess properties enabling their reduction to the impalpable and polished powder without the expensive processes of annealing the ingot and beating it to a leaf.

The method in which I put in operation my said invention is as follows: I first cause an ingot of the usual alloy to be cast in the shape of a disk. I have found a most convenient and economical size to be that of about ten (10) inches in diameter and about three (3) inches in thickness. This disk is then placed in a turning-lathe in such a manner that the cutting-tools thereof will cut or scrape it into thin shavings. It is obvious that the necessary small particles can be produced by other means not so economical, such as filing or boring. The small particles of metal so produced are then subjected to the action of stampers, or small rollers having polished steel or chilled-iron surfaces, the effect of the same being to flatten the particles and to brighten the surfaces thereof, reducing the metal to particles having the same essential properties as the fragments which resulted from the breaking up of the annealed and polished leaves produced under the former method of manufacture. The resultant particles are then subjected to the same and well-known operations used in the old method of manufacturing bronze-powder to further divide and polish the fragments and to reduce them to impalpable powder—to wit, grinding, &c.

By this discovery I am enabled to eliminate from the process of making bronze-powder the expensive operations of hammering, annealing, rolling, and beating the ingot attendant upon the former method of manufacture.

What I claim as my invention, and desire to secure by Letters Patent, is—

1. The above-described process of making bronze-powder—viz., the production of shavings or scrapings from an ingot of metal by means of a lathe-tool or its equivalent, and the subsequent flattening and polishing of the same by means of stamps and rollers, and pulverizing the same by grinding mechanism, substantially as described.

2. In the manufacture of bronze-powder, the production of fragments by shaving or scraping from an ingot of alloy particles of metal adapted to pulverization and polishing, and the flattening and breaking of the same by stamps, preparatory to pulverization and polishing by the usual methods.

3. In the manufacture of bronze-powder, the process of polishing the metal while in a fragmentary state by subjecting the particles obtained as above described to the action of polished steel or chilled-iron surfaces preparatory to the final comminution thereof, substantially as described.

LEOPOLD BRANDEIS.

Witnesses:

LUDWIG BRANDEIS,

JAMES HUESTON.